Patented June 18, 1940

2,204,619

UNITED STATES PATENT OFFICE 2,204,619

PRODUCTION OF SHAPED CATALYSTS

Mathias Pier, Heidelberg, and Eugen Anthes, Ludwigshafen-on-the-Rhine, Germany, assignors, by mesne assignments, to I. G. Farbenindustrie Aktiengesellschaft, Frankfort-on-the-Main, Germany, a corporation of Germany No Drawing. Application December 7, 1937, Serial No. 178,444. In Germany January 23, 1934

11 Claims. (Cl. 23—236)

The present invention is a continuation in part of our invention forming the subject-matter of our copending application Ser. No. 2,422, filed January 10, 1935, which relates to a process for the preparation of catalysts by stirring finely divided solid catalytic substances together with a liquid, grinding the resulting mass, adding another powdered solid substance and pressing the whole into pieces of a definite shape. The object of this process is the preparation of highly active catalysts which retain their shape under the working conditions, this property being often desirable when carrying out catalytic reactions.

It is a further development of this process with particular catalytic substances with which the present invention is concerned.

We have found that very valuable catalysts are obtained which are suitable for a variety of processes, in particular for the destructive hydrogenation of carbonaceous materials when making an oxidic metal compound, especially an oxide or hydroxide, which is capable of acting as an acid, such as molybdic acid or tungstic acid or chromium trioxide, in a finely divided state up into a paste with a liquid and with another metal compound, which is capable of setting with the first mentioned metal compound, such as zinc oxide or magnesium oxide, then drying the mass, grinding it, preferably after previously breaking it up, adding a powder of a substance which when in the state of the same comminution as the ground mass has a smaller hardness than the latter (i. e., which feels smoother when rubbed between the fingers and has also a smaller capacity of attacking the surfaces of crystals when rubbed onto them) and pressing the whole into pieces of a desired shape.

As oxidic metal compounds capable of acting as an acid may be employed the oxides and hydroxides or also the carbonates or the phosphates of metals from groups 4 to 7 and in particular of the 6th group of the periodic system, such as of molybdenum, tungsten, titanium, vanadium or manganese. These are comminuted, preferably to a grain size of from $\frac{1}{3}$ to $\frac{1}{10}$ of a millimeter. As metal compounds capable of setting with the first mentioned metal compound mainly those come into consideration which may act as a base as for example, besides the aforesaid zinc oxide and magnesium, the hydroxides of these metals or their carbonates, or the corresponding compounds of calcium, aluminum or beryllium, such as aluminum oxide in the form of bauxite, or beryllia and the like. Usually the said metal compounds capable of setting with the first mentioned metal compounds are employed in such amounts that the mixture with the latter contains between 20 and 80 per cent of them. Preferably the different compounds are employed in about stoichiometrical amounts, as for example in the molecular ratios 1 to 1 or 1 to 2 or 2 to 3.

The pasting up of the said substances is preferably effected by stirring or kneading with water or an aqueous solution, such as dilute acids or solutions of metal compounds capable of exerting as such or by an aftertreatment of the catalyst a promoting action. The amount of liquid to be employed is at least 20 per cent, advantageously at least 30 per cent calculated with reference to the metal compound; but generally speaking 100 per cent is not exceeded.

The resulting pasty mass is then dried preferably by exposing it to an elevated temperature so that a substantial removal of liquid takes place. No complete removal is necessary. Thus some water has been bound up by the mass; this water is preferably retained because firstly comparatively high temperatures would be necessary for expelling the same and secondly the activity of the catalyst might easily suffer therefrom. Usually the drying is continued until the mixture contains about from 2 to 10 per cent of water.

The residual mass is then ground, if desired after breaking it up, so that the grain size is substantially reduced, for example down to onethird of a millimeter.

If desired some further liquid, such as water or aqueous solutions, may be supplied to the mass at this stage or after having added thereto the further powderous substance having a less hardness. The amount of this liquid is so adjusted that the consistency of the mass to be subjected to pressing is suited to this step; for this purpose preferably from 5 to 15 per cent of liquid with reference to the ground mass are employed. In this case also liquids other than water or aqueous solutions are very suitable, as for example benzine or illuminating oils or other hydrocarbon oils which preferably should be free from asphalt. The addition of this further liquid comes mainly into consideration when the ground mass contains an insufficient amount of the liquid first added or when it is desired to employ another liquid or when solid substances are to be added in a dissolved form.

As powderous solid substances having a less hardness than the ground mass and which are added to the latter various materials may be employed. In particular the aforesaid acid or basic metal compounds or their mixtures having not been pasted up are employed because they are softer in view of the fact that the said pasting up, drying and grinding usually imparts to the particles a higher hardness than they had before, probably in view of the setting or cementing process which the said acid and basic substances undergo while in a paste with the first-mentioned liquid. But also other solid substances may be employed instead of or in addition to the said metal compounds; among these may be mentioned other metal compounds or active carbon, active silica, brown coal small coke which has been activated or treated with acids, bauxite, bentonite or asbestos. These additions of metal compounds or other substances are employed for example in an amount of from 5 to 80 per cent, preferably from 10 to 40 per cent of the ground solid mass. Small amounts of hydrocarbons of high molecular weight, as for example paraffin waxes, or of esters of high molecular weight, waxes, organic acids or ketones, both of high molecular weight, or adhesives, such as glue, may also be added to the mass.

The mass is then pressed into the desired shape, as for example into pills, cubes, balls or stars by means of mechanical pressing; a thread or rod may also be produced and then broken up.

The shaped pieces may then be further activated with gases, such as hydrogen, steam, nitrogen or oxides of carbon, if desired at elevated temperatures.

The catalysts according to this invention may be employed with advantage in many reactions for example in the splitting and in particular in the hydrogenation (destructive or non-destructive) of carbonaceous substances, such as in the conversion of higher boiling hydrocarbons into lower boiling hydrocarbons or of coals into oils by destructive hydrogenation or in the production of aromatic hydrocarbons by destructive hydrogenation at temperatures above 500° C. or in the desulphurization by refining hydrogenation or in the hydrogenation of aromatic hydrocarbons, or also in polymerization reactions, in the dehydrogenation, or in the production of acetaldehyde from acetylene and steam or for the purification of gases and other processes.

The following example will further illustrate the nature of this invention but the invention is not restricted to this example.

*Example*

A power consisting of equimolecular amounts of molybdic acid, zinc oxide and magnesium oxide is well stirred with half its volume of water. The pasty mass thus obtained is spread onto sheets and dried at 120° C. until it only contains 10 per cent of water. The solid mass is then broken up and ground to a powder. This is then mixed with 10 per cent of the dry powder originally employed. From 10 to 13 per cent of water is evenly distributed on the mixture by spraying. The mass thus obtained is pressed to shaped pieces in a machine for making tablets. It constitutes a very active catalyst for destructive hydrogenation of carbonaceous materials and retains its shape during this process.

A catalyst likewise active and retaining its shape is obtained if instead of the beformentioned powder consisting of molybdic acid, zinc oxide and magnesium oxide, a powder consisting of tungstic oxide and zinc oxide or of chromium oxide and zinc oxide is employed.

What we claim is:

1. A process for the preparation of a shaped catalyst by means of mechanical pressing which comprises pasting up with an aqueous liquid such catalytically active oxidic compound of a metal selected from groups 4 to 7 of the periodic system as is capable of acting as an acid, together with another metal compound which is capable of setting with the first mentioned compound, then subjecting the resulting paste to drying, grinding the dried mass, adding thereto a mixture of the same acid substance and of the substance capable of setting therewith when pasted up with an aqueous liquid, but which mixture has not been subjected to the said pasting, drying and grinding treatment, and finally pressing the whole into shaped pieces.

2. A process for the preparation of a shaped catalyst by means of mechanical pressing which comprises pasting up an oxidic acid compound of a metal of group 6 of the periodic system with from 20 to 100 per cent of water, together with another metal compound which is capable of setting with the first mentioned compound, then subjecting the resulting paste to drying to a water content between 2 and 10 per cent, grinding the dried mass, adding to the ground mass a mixture of the said oxidic compound and of the said other metal compound, which mixture has not been subjected to the said pasting, drying and grinding treatment, and finally pressing the whole into shaped pieces.

3. In the process as claimed in claim 1, starting from an oxidic acid compound of a metal selected from group 6 of the periodic system.

4. In the process as claimed in claim 1, adding to the ground mass before pressing a liquid in an amount of between 5 and 15 per cent of the ground mass.

5. Process according to claim 2 in which the amount of said last added mixture is from 5 to 80 per cent by weight of the ground mass.

6. Process according to claim 2 in which the amount of said last added mixture is from 10 to 40 per cent by weight of the ground mass.

7. Process according to claim 2 in which a liquid is added to the ground mass before pressing in an amount of between 5 and 15 per cent of the ground mass.

8. Process according to claim 2 in which water is added to the ground mass in an amount of between 5 and 15 per cent of the ground mass.

9. In the process as claimed in claim 1, grinding the pasted up and dried mass to a grain size of from ⅓ to 1/10 of a millimeter.

10. A destructive hydrogenation catalyst for the catalytic destructive hydrogenation of carbonaceous materials under conditions of temperature and pressure suitable for this conversion the step of working in the presence of a shaped hydrogenation catalyst which has been prepared by pasting up with an aqueous liquid such catalytically active oxidic compound of a metal selected from group 6 of the periodic system as is capable of acting as an acid together with another metal compound which is capable of setting with the first mentioned compound, then subjecting the resulting paste to drying, grinding the dried mass, adding thereto a mixture of the same acid substance and of the substance capable of setting therewith when pasted up with an aqueous liquid, but which mixture has not been subjected to the said pasting, drying and grinding treatment and finally pressing the whole into shaped pieces.

11. As a composition of matter a shaped catalyst prepared by pasting up with an aqueous liquid such catalytically active oxidic compound of a metal selected from groups 4 to 7 of the periodic system as is capable of acting as an acid together with another metal compound which is capable of setting with the first mentioned compound, then subjecting the resulting paste to drying, grinding the dried mass, adding thereto a mixture of the same acid substance and of the substance capable of setting therewith when pasted up with an aqueous liquid, but which mixture has not been subjected to the said pasting, drying and grinding treatment and finally pressing the whole into shaped pieces.

MATHIAS PIER.
EUGEN ANTHES.